Patented Feb. 17, 1953

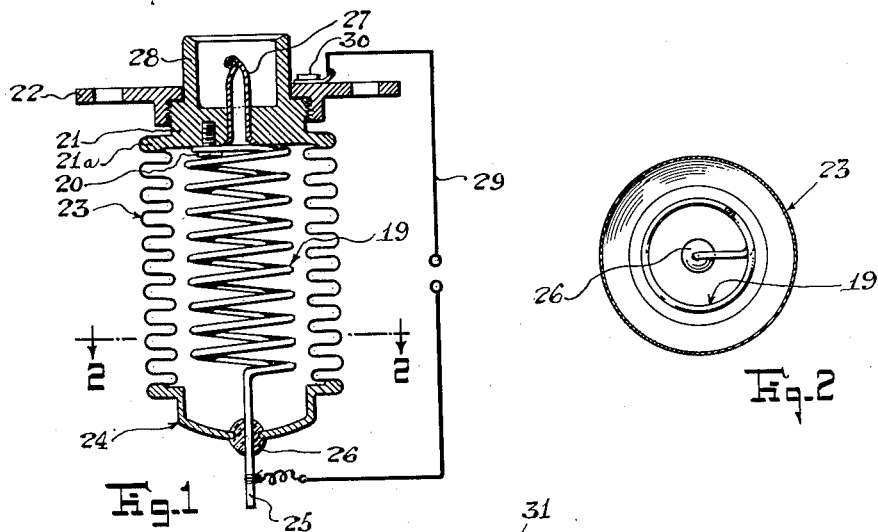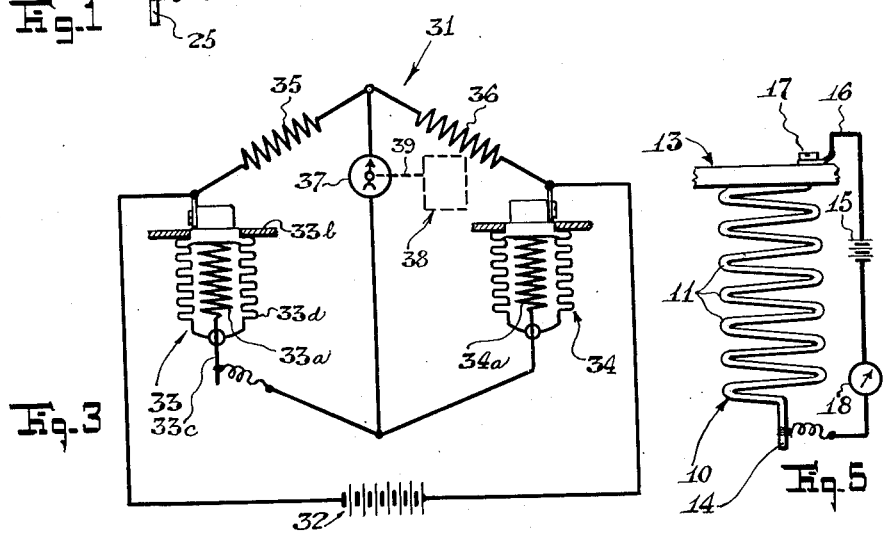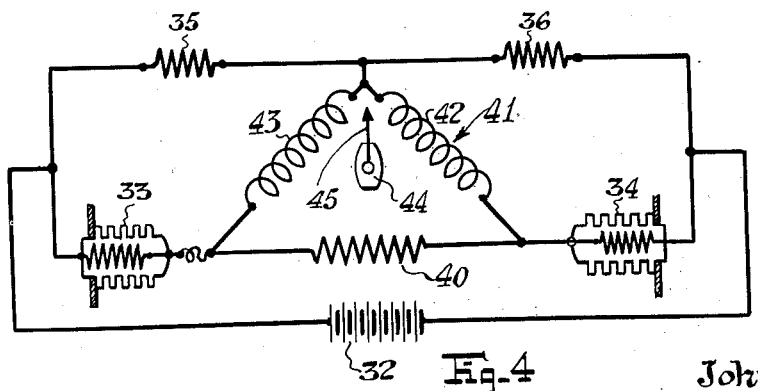

2,629,038

UNITED STATES PATENT OFFICE 2,629,038

STRAIN-SENSITIVE ELECTRICAL DEVICE AND SYSTEM THEREFOR

John J. Dietz, New Milford, N. J., assignor to Thomas A. Edison, Incorporated, West Orange, N. J., a corporation of New Jersey Application June 16, 1949, Serial No. 99,478

4 Claims. (Cl. 201—48)

This invention relates to electrical resistance devices which have a varying electrical resistance with deformation thereof, and particularly to such devices which are adapted for producing resistance variations with changes in displacement, pressure, force, or of quantities representable in terms thereof. The invention further relates to electrical circuit systems, including such a device utilized as a transmitter, for measuring, controlling and/or regulating quantities at a distance.

An object of the invention is to provide novel strain-sensitive resistance devices, or transmitters, which are adapted for use in measuring, controlling and/or regulating systems.

Another object is to provide such devices which are adapted particularly for use in electrical circuits carrying large currents.

Another object is to provide a novel resistance device which is strain-sensitive only while it is current-energized.

Another object is to provide such strain-sensitive resistance devices which are also current- and temperature-responsive.

Another object is to provide systems for compensating for the sensitivity of such strain-sensitive devices to undesired variables.

Another object is to provide measuring and/or control systems including a strain-sensitive device of the character mentioned, which systems are compensated for variations in ambient temperature and/or variations in the current supply.

The present strain-sensitive devices comprise temperature-responsive electrical resistance elements which are heated to a temperature above that of the ambient by passing an electric current therethrough and which are arranged to have a heat dissipation which varies with deformation of the elements so that variations in displacement may produce variations in the temperature of the elements and corresponding variations in their resistance. In particular applications, these elements are spring-loaded so that the deformation thereof is proportional to force or pressure.

These and other objects and features of my invention will be apparent from the following description and the appended claims.

In the description of my invention, reference is had to the accompanying drawings, of which:

Figure 1 is a view, partly in section, of a preferred form of strain-sensitive resistance device according to my invention;

Figure 2 is a cross sectional view taken substantially on the line 2—2 of Figure 1;

Figure 3 is a schematic diagram of a bridge circuit arrangement including a pair of strain-sensitive resistance devices wherein one is adapted to compensate for response of the other to undesired variables;

Figure 4 is a schematic diagram of another compensating bridge arrangement wherein a ratio-type measuring instrument is employed; and Figure 5 is a view of a simplified strain-sensitive resistance device according to my invention.

A strain-sensitive electrical resistance device according to my invention comprises a temperature-responsive resistance element capable of being deformed and which with change in deformation has a varying heat dissipation. Such a resistance element is preferably made of a resilient material and is shaped to have portions folded back on itself so that, with deformation, the relative spacing between the adjacent folded portions will vary. For example, in a simplified form of the invention shown in Figure 5, a spring member 10 of flat metal stock is folded into a sinuous shape having any desired number of successive convolutions 11. One end of this spring member is secured as by welding to a base 13 and the other end 14 is left free to be flexed in directions to vary the spacing between the successive convolutions. This spring member is heated by an electric current as from a battery 15 in a circuit 16 one end of which is connected to the base 13 as to a terminal lug 17 and the other end of which is connected to the free end 14. The current which passes through the spring member 10 is of such value that the spring member is heated to a relatively-high temperature—typically 500° to 600° F.—and the material of the spring member is preferably one which has high strength and a high temperature coefficient of resistance at such elevated temperatures. Suitable materials, for example, are tungsten, moylbdenum and nickel.

The heat dissipation or cooling action, by way of convection and radiation, of a heated body is dependent upon its effective area of exposure to the surrounding ambient. As the tortuous spring member 10 is stretched outwardly, the spacing between adjacent convolutions is increased to increase the effective area of exposure and, as a result, the cooling action is faster to cause the temperature to fall as for any given current energization and any given ambient temperature. Conversely, as the spring member is contracted, its effective exposure area is reduced to cause its temperature to rise provided the same current energization and ambient temperature are maintained. Such variations in resistance may be detected by an ammeter 18 placed serially in the circuit 16. Thus, variations in the positioning of the free end relative to the base 13 are reflected as corresponding resistance and current variations in the electric circuit 16.

The cooling of the spring member 10 is principally by convection when the spring member is heated to temperatures within the range above-noted, since at these temperatures the spring member is not heated to a red-hot condition at which radiation losses are substantial. In order to facilitate the cooling by convection and to render the cooling less sensitive to surrounding air currents, while still minimizing radiation losses, the spring member is preferably mounted inside a gas-filled enclosure shown in Figure 1.

In the embodiment of Figure 1 a different and preferred configuration of resistance element is shown. Here, this element consists of a coiled wire in the form of a helical spring 19 having one end fastened by a screw 20 to a stationary head 21. This head 21 is threaded into an apertured mounting plate 22. The head has a rim flange 21a to which one end of a bellows 23 is sealed. The bellows surrounds the helical spring and has the other end thereof closed by a movable end wall 24. This wall has a central aperture through which extends a straight axial extension 25 of the helical spring 19. A glass bead 26 is provided in this aperture to seal the wall 24 to the spring extension 25.

The bellows is filled to atmospheric pressure with a gas having high heat conduction, a preferable gas being hydrogen. The gas is introduced by way of a glass stem 27 which traverses the head 21 and is sealed thereto. After the filling operation the end of the stem is fuzed closed as indicated in the drawing. In order to afford protection to the projecting stem the same is surrounded by a tubular extension 28 which is a part of the head 21. A circuit 29 for supplying heating current to the helical spring member 19 has one end connected to the mounting plate as to a terminal lug 30 and has the other end connected to the axial extension 25 of the spring.

The cooling action of the helical spring wire 19 is believed to occur in the following manner, although no limitation of the invention is intended by reason of the explanation here given. It is believed that surrounding the wire of the helical spring member is a layer of hot hydrogen gas which tends to adhere thereto. Within the bellows, however, there is a constant flow of gas, by convection, which carries the heat from this hot region to the relatively cool surface of the bellows whereat it is dissipated to the outside air. The thickness of the layer of hot gas about the wire is substantially independent of the diameter of the wire and, accordingly, a wire of small diameter has proportionately greater cooling action than has a wire of larger diameter. When the helical spring is in a contracted condition wherein the adjacent wire convolutions are in close proximity with one another, the cooling action of the helix is much like a solid wire having a diameter of that of the helix. As the helix is stretched to space apart the convolutions, as to a condition indicated in Figure 1, the cooling action is more nearly like that of a straight wire whose diameter is that of which the helix is made. It follows therefore that the cooling rate of the helix is much greater when the helix is in a stretched condition than when it is in a contracted condition. Accordingly, a convoluted member, which has a positive temperature coefficient and which is heated by a given current passing therethrough, will have a lesser resistance as the spring is stretched and a greater resistance as the spring is contracted.

In Figure 3 there is illustrated a circuit arrangement, including the variable resistance device above described, for indicating the positioning of an element. This circuit arrangement comprises a Wheatstone bridge 31 having two branches in parallel connected to a voltage source 32. Each branch includes two arms. One of these arms comprises a strain-sensitive variable resistance device 33 as shown in Figure 1; the second of these arms comprises a like such device 34 which is provided for compensating purposes hereinafter explained; and the remaining two arms comprise respective resistors 35 and 36. By way of illustration, the two resistors 35 and 36 may be in one branch and the two variable resistance devices 33 and 34 may be in the other branch. Connected diagonally across the bridge is a current-responsive instrument 37.

The voltage of the source 32 is so chosen that the convoluted elements 33a and 34a of the variable resistance devices 33 and 34 are heated to a temperature substantially above that of the ambient but not to a red-hot temperature. The device 33, which is the detecting device of the system, is mounted on a stationary support 33b and has a projecting element 33c movable relative thereto. In response to such movement, the resistance of the convoluted element 33a is varied as above described. Thus, the resistance is an indication of the positioning of the element 33c with respect to the stationary support 33b. These resistance variations will produce similar current variations in the cross arm of the bridge and, upon suitable calibration of the instrument 37, this instrument will indicate the positioning of the movable element 33c.

The variable resistance device 34 is provided to compensate for the response of the detecting device to undesired variables, particularly for changes in the ambient temperature. For instance, variations in the ambient temperature produce proportional variations in the resistances of both devices 33 and 34 and, as a result, the response of one of the devices substantially cancels that of the other so that changes in the ambient temperature per se have little influence on the current in the cross arm of the bridge. Also, the device 34 has a compensating benefit as to variations in the voltage supply since such voltage variations produce proportional changes in the resistances of both devices 33 and 34.

The bellows 33a of the resistance device 33 may be spring-loaded in any suitable way so that a given force is required to effect a predetermined displacement of the movable element 33c. For any given spring-loading of the device 33 the instrument 37 may be calibrated to measure the force or pressure exerted on the element 33c. Similarly, other quantities representable in terms of force, pressure or displacement may be measured by suitable calibration of the instrument 37.

In the foregoing description the variable device 34 has been considered only as a compensating device for the system. Additionally, this device may also be strain-sactuated while performing its compensating functions. When so actuated, the instrument 37 will respond according to the relative actuation of the two devices 33 and 34. When the respective actuations are produced in proportion to variations in other quantities, then response of the instrument 37 is an indication of the ratio of those quantities.

As another modification of the system shown in Figure 3, the instrument 37 may be a control device for regulating or controlling some other apparatus 38 to which it is connected by a coupling 39, it being sufficient herein to show such apparatus and coupling only diagrammatically as in Figure 3.

In Figure 4 there is shown another bridge circuit arrangement incorporating the variable resistance device 33 as a detecting device and the variable resistance device 34 as a compensating device. This bridge circuit is of the type described and claimed in the pending Kelly Patent No. 2,362,562. This bridge comprises two branches, one of which serially includes the variable resistance devices 33 and 34 and the other the resistors 35 and 36. In the first branch, however, there is additionally a centrally-located resistor 40. This resistor constitutes the base of an electrical delta 41 which forms the cross arm of the bridge. The sides of this electrical delta comprise respective coils 42 and 43 which are the field coils of a current ratiometer such, for example, as is described also in the Kelly patent just mentioned. Such a ratiometer is arranged so that the magnetic fields of the two coils 42 and 43 are superimposed. In these superimposed fields there is a pivoted permanent magnet 44 having, for example, an indicating pointer 45 connected thereto. The magnet seeks positions wherein its magnetic axis is in alignment with the effective axis of the two superimposed magnetic fields and, accordingly, the magnet varies its positioning according to the ratio of the currents in the two field coils. This ratio of the coil currents in turn varies according to the degree of unbalance of the bridge network and therefore the meter indicates according to the degree of strain actuation of the variable resistance device 33. By using a ratiometer in the cross arm of the bridge as described, the bridge circuit itself is compensated for variations as to voltage supply so that such variations will not tend to influence the indications of the indicating meter. This compensation is in addition to that obtained from the compensating device 34 per se above described.

The embodiments of my invention hereinabove particularly shown and described are intended to be illustrative and not limitative of my invention, since they are subject to changes and modifications without departure from the scope of my invention, which I endeavor to express according to the following claims.

I claim:

1. A strain-sensitive resistance device comprising a temperature-responsive electrical resistance element having adjacent portions folded back on itself and having the capability of being flexed to vary the separation between said adjacent portions whereby to vary the effective exposure area of the element to the surrounding ambient, a sealed enclosure about said resistance element having relatively movable walls, means connecting said walls to different portions of said resistance element to cause flexure of the latter as the walls are relatively moved, said resistance element being adapted to be connected across a source of electrical energy and to be heated by current flow therethrough, and terminal means connected to the ends of said resistance element and extending beyond said enclosure.

2. A strain-sensitive electrical resistance device comprising a mounting member, a yieldable spring member connected at one end to said mounting member and having adjacent portions in folded relation to each other, said spring member being characterized as having a temperature-responsive resistance, a bellows around said spring member having an end wall sealed to said mounting member and having another end wall traversed by a free end portion of said spring member, insulating means sealing said other end wall of said bellows to said free end portion of said spring member, and a gas in said bellows having high heat conductivity.

3. A strain-sensitive resistance device comprising an elongate member of a resilient character having a convoluted shape, and said member being adapted to be connected across a source of electrical energy to be heated thereby, a sealed envelope enclosing said member, said envelope having relatively movable walls, means securing one portion of said member to one of said walls and a relatively movable portion of said member to the other of said walls whereby the spacing between successive convolutions of said member is varied as said walls are relatively moved, and electrical terminals sealed tight through said envelope and connected to the ends of said member.

4. A strain-sensitive resistance device comprising a sealed metallic bellows, a temperature-sensitive resistance element fastened to opposite end walls of said bellows and centrally disposed in said bellows, said resistance element having a helical shape the successive convolutions of which are moved closer and farther apart as said bellows is compressed and expanded, said resistance element being adapted to be connected across a source of electrical energy and to be heated above ambient temperature by flow of electrical current therethrough, terminal means for establishing electrical connections to the ends of said resistance element, and a gas medium filling said bellows to provide effective heat transfer from said resistance element to said bellows according to the spacing between said convolutions.

JOHN J. DIETZ.

REFERENCES CITED

The following references are of record in the file of this patent:

UNITED STATES PATENTS

| Number | Name | Date |
|--------|------|------|
| 662,156 | Waring | Nov. 20, 1900 |
| 1,458,098 | Heurtley | June 5, 1923 |
| 1,562,243 | Moeller | Nov. 17, 1925 |
| 2,359,245 | Ritzmann | Sept. 26, 1944 |
| 2,423,609 | Middleton et al. | July 8, 1947 |
| 2,455,394 | Webber | Dec. 7, 1948 |
| 2,484,030 | Hastings | Oct. 11, 1949 |